United States Patent
Lee

(10) Patent No.: US 11,418,444 B2
(45) Date of Patent: Aug. 16, 2022

(54) IPV6 NETWORK NODE MANAGING METHOD AND EQUIPMENT

(71) Applicant: UPAS CORPORATION, Taipei (TW)

(72) Inventor: Kun-Jung Lee, Taipei (TW)

(73) Assignee: UPAS CORPORATION, Taipei (TW)

( * ) Notice: Subject to any disclaimer, the term of this patent is extended or adjusted under 35 U.S.C. 154(b) by 0 days.

(21) Appl. No.: 17/025,555

(22) Filed: Sep. 18, 2020

(65) Prior Publication Data

US 2021/0377170 A1    Dec. 2, 2021

(30) Foreign Application Priority Data

May 29, 2020   (TW) .................................. 109118061

(51) Int. Cl.
  *H04L 45/741*   (2022.01)
  *H04L 61/251*   (2022.01)
  *H04L 45/02*    (2022.01)
  *H04L 43/18*    (2022.01)
  *H04L 61/5014*  (2022.01)

(52) U.S. Cl.
  CPC ............ *H04L 45/741* (2013.01); *H04L 43/18* (2013.01); *H04L 45/02* (2013.01); *H04L 61/2015* (2013.01); *H04L 61/251* (2013.01)

(58) Field of Classification Search
  CPC ... H04L 67/02; H04L 63/029; H04L 67/2838; H04L 65/4084; H04L 61/2015; H04L 67/06; H04L 67/32; H04L 67/1021; H04L 67/28; H04L 63/0272; H04L 67/2814; H04L 67/42; H04L 61/2007; H04L 12/4633; H04L 69/16; H04L 61/2514; H04L 61/1511; H04L 61/2575; H04L 61/2589; H04L 61/609; H04L 12/2803; H04L 49/40; H04L 61/103; H04L 61/2553; H04L 61/256; H04L 61/2585; H04L 61/2592; H04L 63/0281
  See application file for complete search history.

(56) References Cited

U.S. PATENT DOCUMENTS

| | | | | |
|---|---|---|---|---|
| 2009/0125957 A1* | 5/2009 | Singh | ................ | H04L 61/6022 725/111 |
| 2010/0091684 A1* | 4/2010 | Winter | .............. | H04L 29/12264 370/254 |
| 2013/0067043 A1* | 3/2013 | Gaitonde | ............ | H04L 61/2015 709/220 |
| 2020/0314060 A1* | 10/2020 | Gundavelli | ........... | H04L 63/168 |

* cited by examiner

*Primary Examiner* — Djenane M Bayard
(74) *Attorney, Agent, or Firm* — George S. Blasiak; Heslin Rothenberg Farley & Mesiti PC

(57) ABSTRACT

Disclosed is an IPv6 network node managing method, comprising: a packet collecting step, a packet analyzing step, and an IPv6 address assigning step, for assigning a network node management IPv6 address with a visually recognizable suffix address code to a target network node which requests an IPv6 address assignment of DHCPv6, thereby improving IPv6 address recognition of the target network node and facilitating management of the network nodes.

7 Claims, 7 Drawing Sheets

IPV6 NETWORK NODE MANAGING METHOD AND EQUIPMENT

CROSS REFERENCE TO RELATED APPLICATIONS

This U.S. Patent Application claims priority to Taiwan Application No.: 109118061, filed on May 29, 2020, which is incorporated by reference herein in its entirety.

FIELD OF THE INVENTION

The present invention relates to an IP address management, and more particularly relates to an IPv6 network node managing method and equipment.

BACKGROUND OF THE INVENTION

An Internet Protocol address, referring to IP address, is a serial number of digital label assigned to a network node that uses Internet Protocol to communicate with other network nodes in a computer network. In Internet Protocol, Internet Protocol version 4, referring to IPv4, is the first widely popular version of the Internet Protocol. An IPv4 address is with 32 bits, i.e., 4 bytes, to define 4,294,967,296 ($2^{32}$) different IPv4 addresses. IPv4 addresses is allowed to be written in any kind of forms representing the 32-bit address value, and usually the IPv4 addresses are written in form of dot-decimal notation.

With the rapid development of computer network technology, a new version of the Internet Protocol, called Internet Protocol version 6, referring to IPv6, is introduced in order to replace IPv4 for sake of dealing with the problem of IPv4 address exhaustion. It thus is very common that IPv4 and IPv6 addresses coexist in a computer network. However, the IPv6 address is with 128 bits, which would cause its form different from that of the IPv4 address. As a result, it is very inconvenient for users to perform manual recognition and to manage IPv4 network nodes together with IPv6 network nodes in a network environment where IPv6 and IPv4 addresses coexist. This problem is needed to be improved.

SUMMARY OF THE INVENTION

Accordingly, one objective of the present invention is to provide an IPv6 network node managing method and equipment, which can improve recognition for managing the network nodes, so as to facilitate manual identification and management of the network nodes.

In order to overcome the technical problems in prior art, the present invention provides an IPv6 network node managing method, which is applied to a network environment where IPv6 and IPv4 addresses are coexisted, for managing network nodes of the network environment, the IPv6 network node managing method comprising: a packet collecting step, which utilizes a packet collecting device to collect network node packets of each network node in the network environment; a packet analyzing step, which utilizes a packet analyzing device to analyze the network node packets collected in the packet collecting step to obtain, from the network node packets, network node information belonging to the network nodes, and creates an IP and MAC address correspondence table according to the network node information, wherein the network node information contains IP address information and MAC address information; and an IPv6 address assigning step, which utilizes a DHCPv6 service device to assign a network node management IPv6 address, which is generated according to the IP and MAC address correspondence table, to a target network node which requests an IPv6 address assignment, wherein the DHCPv6 service device directly substitutes decimal numbers of dot-decimal notation number groups, which have been given to an assigned IPv4 address of the target network node, for hexadecimal numbers of colon-hexadecimal notation number groups in suffix positions of the network node management IPv6 address without performing a decimal-to-hexadecimal base conversion, thereby generating the network node management IPv6 address with a visually recognizable suffix address code.

In one embodiment of the present invention, the IPv6 network node managing method is provided, wherein in the packet analysis step, the IP address information of the network node information includes IPv6 address information of the network node, and the packet analyzing device obtains, from the network node packets regarding a neighbor solicitation packet and/or a neighbor advertisement packet which are defined by a neighbor discovery protocol, the network node information containing the IPv6 address information and/or the MAC address information.

In one embodiment of the present invention, the IPv6 network node managing method is provided, wherein in the packet analyzing step, the operation of obtaining, from the network node packets, the network node information containing the IPv6 address information and/or the MAC address information includes: an IPv6 packet classifying sub-step, which classifies the network node packet having an EtherType field content of "0x86DD" into an IPv6-classified packet; an ICMPv6 packet classifying sub-step, which classifies the IPv6-classified packet having a Next Header field content of "58" into an ICMPv6-classified packet; and an information acquiring sub-step, which acquires, from the ICMPv6-classified packet having a type field content of "135" or "136", the network node information containing the IPv6 address information and/or the MAC address information.

In one embodiment of the present invention, the IPv6 network node managing method is provided, wherein in the IPv6 address assigning step, the DHCPv6 service device directly substitutes the decimal numbers of all four dot-decimal notation number groups in the assigned IPv4 address of the target network node for the hexadecimal numbers of the colon-hexadecimal notation number groups in the last four suffix positions of the network node management IPv6 address without performing the decimal-to-hexadecimal base conversion.

In one embodiment of the present invention, the IPv6 network node managing method is provided, wherein in the IPv6 address assigning step, when the target network node does not have the assigned IPv4 address, the DHCPv6 service device uses a simulation-configured IPv4 address as the assigned IPv4 address of the target network node, thereby generating the network node management IPv6 address, wherein the simulation-configured IPv4 address is selected from an out-of-range IPv4 address and a non-regular IPv4 address, the out-of-range IPv4 address is an address that is out of an IPv4 address assignment range of the network environment, and the non-regular IPv4 address includes at least one hexadecimal digit from "A" to "F" or has at least one decimal number in dot-decimal notation number group having a value greater than 8 bits.

In one embodiment of the present invention, the IPv6 network node managing method is provided, further comprising an illegal network node blocking step of: comparing the network node information obtained in the packet analyzing step with a predetermined network node allowable list to determine whether the network node having an assigned IPv6 address is a legal network node or is an illegal network node in the network environment; and blocking the network node which is determined as the illegal network node.

In one embodiment of the present invention, the IPv6 network node managing method is provided, further comprising a detection accelerating step of: obtaining a possible undiscovered network node IPv6 address range by performing a computing operation according to the IP address information of the network nodes presently existing in the IP and MAC address correspondence table and an IPv6 address assignment range of the network environment; and sending a detecting packet to a target IPv6 address which is within the possible undiscovered network node IPv6 address range to enforce the corresponding network node in the network environment to sent the network node packet containing the network node information of network node within the possible undiscovered network node IPv6 address range.

In one embodiment of the present invention, the present invention provides an IPv6 network node managing equipment, which is provided in a network environment where IPv6 and IPv4 addresses are coexisted, for managing network nodes of the network environment, the IPv6 network node management equipment comprising: a packet collecting device, configured to collect network node packets of each network node in the network environment; a packet analyzing device, connected to the packet collecting device, being configured to analyze the network node packets collected by the packet collecting device to obtain, from the network node packets, network node information belonging to the network nodes, and to create an IP and MAC address correspondence table according to the network node information, wherein the network node information contains IP address information and MAC address information; and a DHCPv6 service device, connected to the packet analyzing device, being configured to assign a network node management IPv6 address, which is generated according to the IP and MAC address correspondence table, to a target network node which requests an IPv6 address assignment, wherein the DHCPv6 service device directly substitutes decimal numbers of dot-decimal notation number groups, which have been given to an assigned IPv4 address of the target network node, for hexadecimal numbers of colon-hexadecimal notation number groups in suffix positions of the network node management IPv6 address without performing a decimal-to-hexadecimal base conversion, thereby generating the network node management IPv6 address with a visually recognizable suffix address code.

In one embodiment of the present invention, the IPv6 network node managing equipment is provided, further comprising a network node management device, connected to the packet analyzing device, being configured to: compare the network node information obtained by the packet analyzing device with a predetermined network node allowable list to determine the network node having an assigned IPv6 address as a legal network node or is an illegal network node; and block the network node which is determined as the illegal network node.

With the technical means adopted by the present invention, while an IPv6 address is assigned by DHCPv6, an IPv6 address is assigned with a suffix address code same as an IPv4 address, i.e., enabling the network node management IPv6 address to have the visually recognizable suffix address code same as Ipv4 address, thereby improving IPv6 address recognition of the network nodes and facilitating management of the network nodes.

DETAILED DESCRIPTION OF THE PREFERRED EMBODIMENTS

The preferred embodiments of the present invention are described in detail below with reference to FIG. 1 to FIG. 9. The description is used for explaining the embodiments of the present invention only, but not for limiting the scope of the claims.

As shown in FIG. 1 to FIG. 5, an IPv6 network node managing method according to one embodiment of the present invention is applied to a network environment E where IPv6 and IPv4 addresses are coexisted, for managing network nodes N of the network environment E. An IPv6 network node managing equipment 100 is provided in the network environment E, and the IPv6 network node managing equipment 100 includes: a packet collecting device 1, a packet analyzing device 2 connected to the packet collecting device 1, and a DHCPv6 service device 3 connected to the packet analyzing device 2. The IPv6 network node managing method includes the following steps: a packet collecting step S1, a packet analyzing step S2 and an IPv6 address assigning step S3.

Figure 1:
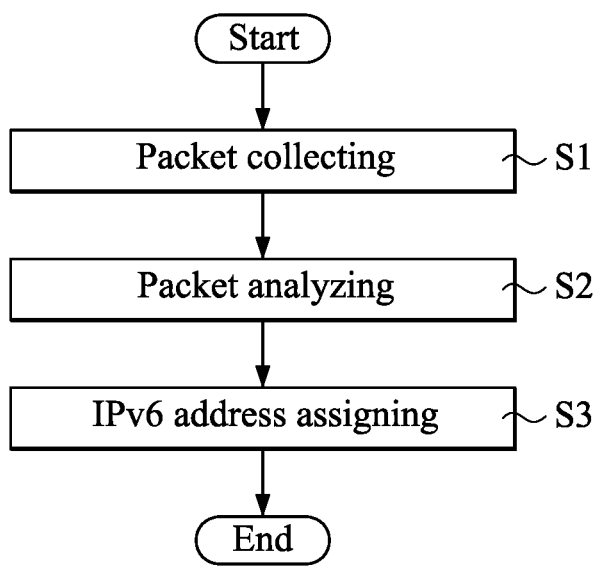
FIG. 1 is a schematic flowchart illustrating an IPv6 network node managing method according to one embodiment of the present invention.
Figure 2:
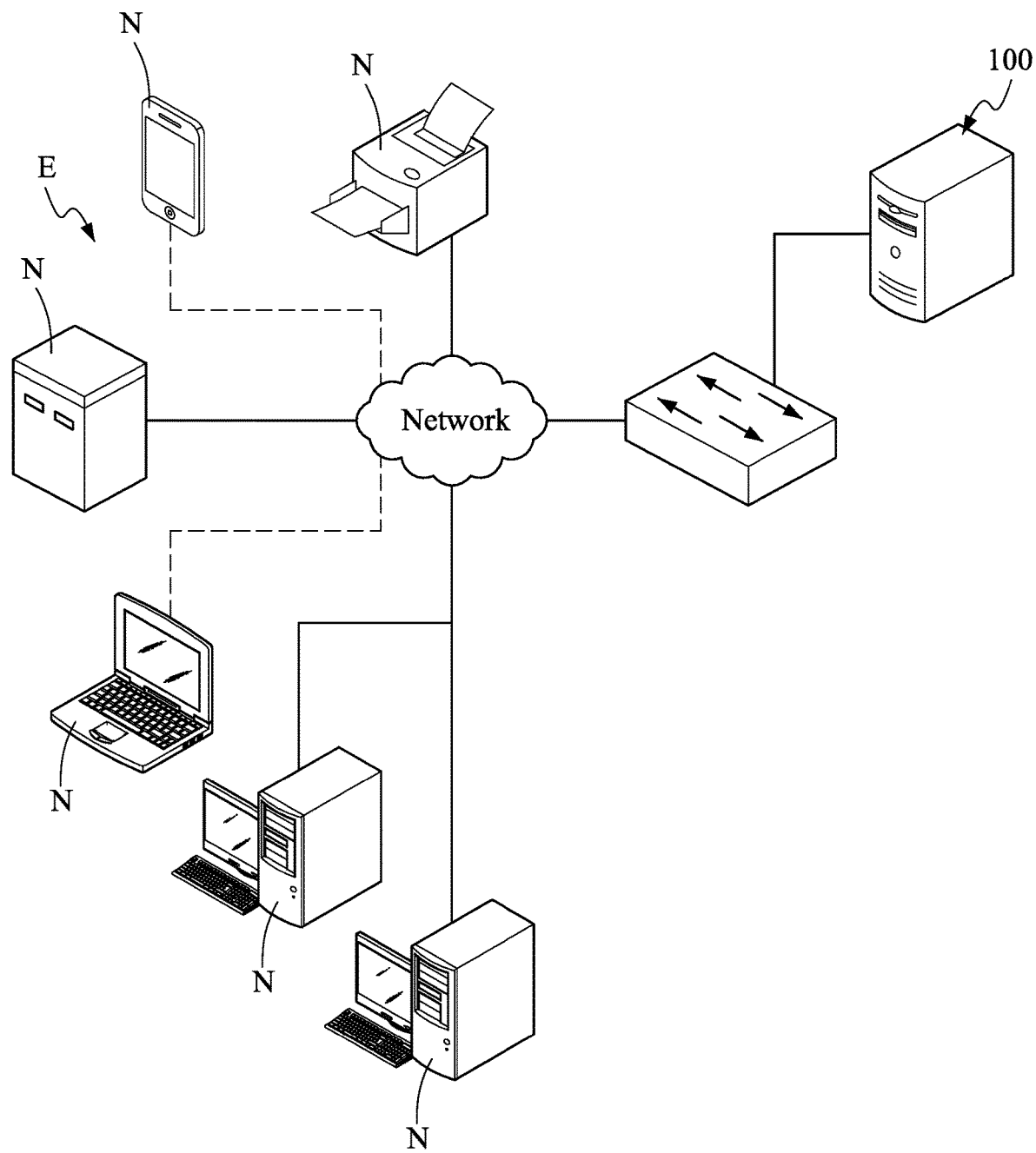
FIG. 2 is a schematic system diagram illustrating an IPv6 network node managing equipment according to the embodiment of the present invention.
Figure 3:
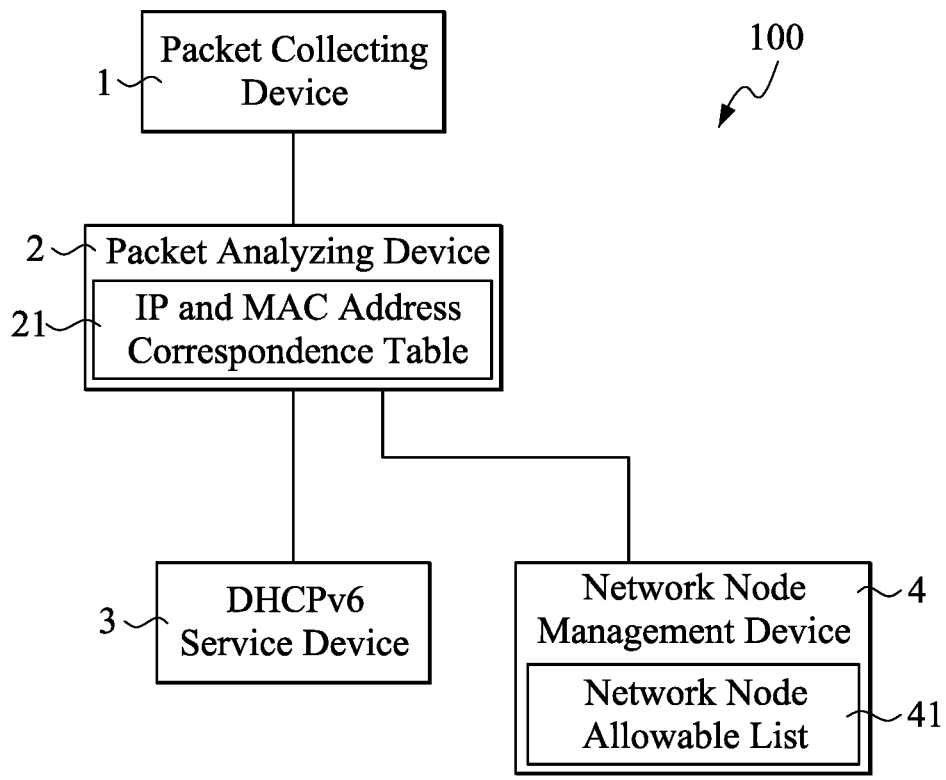
FIG. 3 is a schematic block diagram illustrating the IPv6 network node managing equipment according to the embodiment of the present invention.

As shown in FIG. 1 to FIG. 3, in the packet collecting step S1, the packet collecting device 1 is utilized to collect network node packets of each network node N in the network environment E. Specifically, collecting network packets (i.e., the network node packets) from network nodes in a network environment for subsequent analysis could be regarded as a common technique for network management, and therefore any way known by a person having ordinary skill in the art to collect the network packets can be used in the packet collecting step S1 on which the present invention does not have any limitation.

Furthermore, in the present invention, since the network environment E is a network environment in which IPv6 and IPv4 addresses coexist, the network node packets collected in the network environment E include both IPv6 packet and IPv4 packet. In this case, in the present invention, the IPv6 packet and the IPv4 packet can be collected respectively in different ways or can be collected together in a single way, and the present invention is not limited to this.

As shown in FIG. 1 to FIG. 3, in the packet analyzing step S2, the packet analyzing device 2 is utilized to analyze the network node packets collected in the packet collecting step S1 to obtain, from the network node packets, network node information belonging to the network nodes N, and to create an IP and MAC address correspondence table 21 according to the network node information, wherein the network node information contains IP address information and MAC address information.

Specifically, in the packet analyzing step S2, the IP address information of the network node information includes IPv6 address information of the network node N, and the packet analyzing device 2 obtains, from the network node packets regarding a neighbor solicitation (NS) packet and/or a neighbor advertisement (NA) packet which are defined by a neighbor discovery protocol (NDP), the network node information containing the IPv6 address information and/or the MAC address information, and thereby creating the IP and MAC address correspondence table 21.

The neighbor discovery protocol is a protocol in the IPv6 Internet protocol suite used for OSI layer 3. The neighbor discovery protocol defines five ICMPv6 packet types: router solicitation (Type 133), router advertisement (Type 134), neighbor solicitation (Type 135), neighbor advertisement (Type 136), and redirect (Type 137). The neighbor solicitation can be used to determine a MAC address of a neighbor or to verify that a neighbor cache is still reachable via the MAC address, and is also used for performing a duplicate address detection to check whether an IP address of a network node is already in use. The neighbor advertisement can be used as a response to a neighbor solicitation message or as a notification sent to neighbors when an IP/MAC address of a network node is changed.

Figure 4:
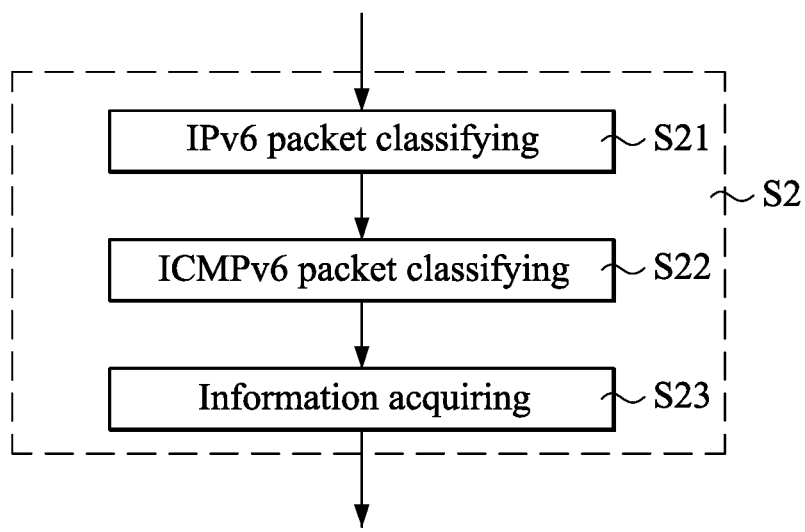
FIG. 4 is a schematic flowchart illustrating a packet analyzing step of the IPv6 network node managing method according to the embodiment of the present invention.

As shown in FIG. 4, in the packet analyzing step S2, the operation of obtaining, from the network node packets, the network node information containing the IPv6 address information and/or the MAC address information includes: an IPv6 packet classifying sub-step S21, an ICMPv6 packet classifying sub-step S22, and an information acquiring sub-step S23.

In the IPv6 packet classifying sub-step S21, the network node packet collected in the packet collecting step S1 and having an EtherType field content of "0x86DD" is classified into an IPv6-classified packet. EtherType is a two-octet field in an Ethernet frame that indicates which protocol is encapsulated in the Ethernet frame. An EtherType field value of "0x86DD" indicates the protocol of IPv6, while "0x0800" indicates the protocol of IPv4, and accordingly, by classifying the network node packet collected in the packet collecting step S1 and having the EtherType field content of "0x86DD" as the IPv6-classified packet, IPv6 network node packets and IPv4 network node packets can be distinguished from each other.

In the ICMPv6 packet classifying sub-step S22, the IPv6-classified packet having a Next Header field content of "58" is classified into an ICMPv6-classified packet. Specifically, in the IPv6-classified packet, a Next Header field value of "58" indicates "ICMPv6". Such packets are thus further classified as the ICMPv6-classified packet in the ICMPv6 packet classifying sub-step S22.

In the information acquiring sub-step S23, from the ICMPv6-classified packet having a Type field content of "135" or "136", the network node information containing the IPv6 address information and/or the MAC address information is acquired. Specifically, when a Type field value is "135", it indicates that the ICMPv6-classified packet belongs to the neighbor solicitation packet, and when a Type field value is "136", it indicates that the ICMPv6-classified packet belongs to the neighbor advertisement packet. Therefore, as mentioned above, the network node information containing the IPv6 address information and/or the MAC address information can be obtained from these two types of packets, and the IP and MAC address correspondence table 21 can be created.

As shown in FIG. 1 to FIG. 3, in the IPv6 address assigning step S3, the DHCPv6 service device 3 is utilized to assign a network node management IPv6 address, which is generated according to the IP and MAC address correspondence table 21, to a target network node N which requests an IPv6 address assignment, wherein the DHCPv6 service device 3 directly substitutes decimal numbers of dot-decimal notation number groups, which have been given to an assigned IPv4 address of the target network node N, for hexadecimal numbers of colon-hexadecimal notation number groups in suffix positions of the network node management IPv6 address without performing a decimal-to-hexadecimal base conversion, thereby generating the network node management IPv6 address with a visually recognizable suffix address code.

Specifically, DHCPv6 (Dynamic Host Configuration Protocol version 6) is a network protocol for configuring IPv6 hosts with IP addresses, IP prefixes and/or other configuration data, and according to the network protocol, the DHCPv6 service device 3 performs the IPv6 address assignment for the target network node N.

The IPv6 addresses are usually represented as eight groups, separated by colons, of four hexadecimal digits, i.e., represented in a format of colon-hexadecimal notation, and therefore, in the present invention, such groups separated by colons are referred to as the colon-hexadecimal notation number group. For example, in an exemplary IPv6 address of "2001:0DB8:0000:0000:0000:FF00:0042:8329", the "2001", "0DB8", "0000", "FF00", "0042", and "8329" are respectively a colon-hexadecimal notation number group.

Compared with the IPv4 address represented in the dot-decimal notation (e.g., "192.168.1.235"), the IPv6 address is not only longer than the IPv4 address, but also represented by hexadecimal digits such that it is more complicated than decimal digits. As a result, it is difficult for a network administrator to remember and identify the correspondence relationship between the network nodes and the IPv6 addresses, and is inconvenient to manage the network nodes. Therefore, in the IPv6 address assigning step S3, the DHCPv6 service device 3 is configured to assign the network node management IPv6 address with the visually recognizable suffix address code to the target network node N, thereby improving IPv6 address recognition of the network nodes N.

Figure 5:
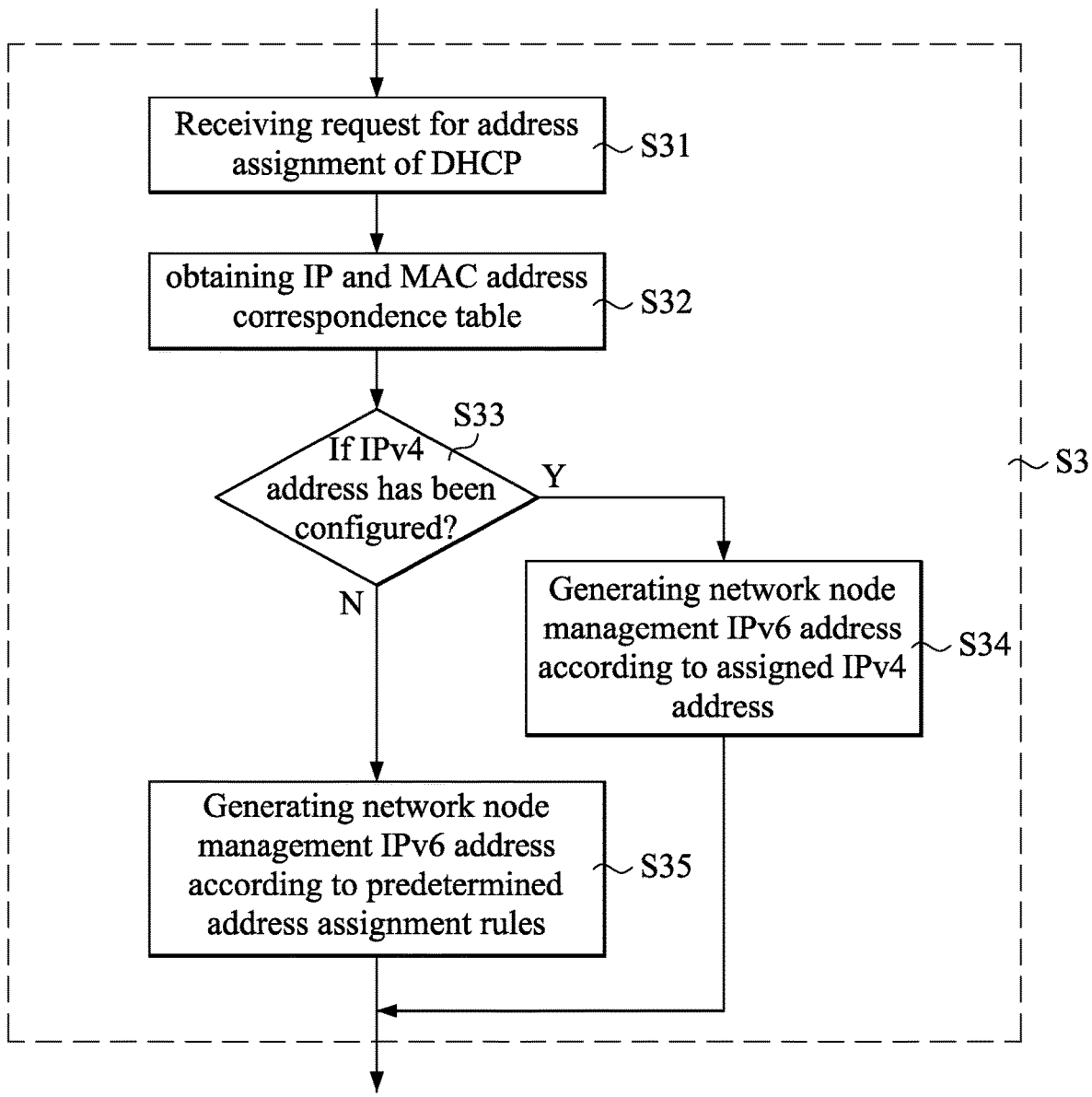
FIG. 5 is a schematic flowchart illustrating an IPv6 address assigning step of the IPv6 network node managing method according to the embodiment of the present invention.

Specifically, as shown in FIG. 5, in the embodiment, the DHCPv6 service device 3 firstly receives a request for an address assignment of DHCPv6, i.e., requesting the IPv6 address assignment, from the target network node N (Sub-step S31). Next, the DHCPv6 service device 3 obtains the IP and MAC address correspondence table 21 created in the packet analyzing step S2 (Sub-step S32). According to the IP and MAC address correspondence table 21, it can be determined whether the target network node N has been configured with an IPv4 address (Sub-step S33).

In the case that the target network node N has been configured with the IPv4 address, the network node management IPv6 address is generated according to the assigned IPv4 address of the target network node N (Sub-step S34). For example, as shown in Table 1 below, when the target network node N has been configured with the IPv4 address (e.g., "192.168.1.235"), the DHCPv6 service device 3 directly substitutes decimal numbers (i.e., "192", "168", "1" and "254") of the dot-decimal notation number groups, which have been given to the assigned IPv4 address of the target network node N, for hexadecimal numbers in suffix positions of a predetermined IPv6 address to be assigned (e.g., "2001:0DB8:0000:0000:????:????:????:????"), thereby generating the network node management IPv6 address (i.e., "2001:0DB8:0000:0000:0192:0168:0001:0235"). Furthermore, since one or more leading zeros from each number group are usually removed for convenience, the network node management IPv6 address can be represented as "2001:DB8:0:0:192:168:1:235", and can be further represented as "2001:DB8::192:168:1:235" by omitting consecutive sections of zeros. In this way, the suffix address code (i.e., "192:168:1:235") of the network node management IPv6 address and the assigned IPv4 address (i.e., "192:168:1:235") of the target network node N are the same in number, and thereby the network administrator can be easy to visually recognize the network node management IPv6 address and identify the correspondence relationship between the network node management IPv6 address and the network nodes N.

TABLE 1

| Assigned IPv4 Address of Target Network Node |
|---|
| 192.168.1.235 |
| Predetermined IPv6 Address to be Assigned |
| 2001:0DB8:0000:0000:????:????:????:???? |
| Network Node Management IPv6 Address |
| 2001:0DB8:0000:0000:0192:0168:0001:0235 |
| Network Node Management IPv6 Address |
| (after removing all leading zeros) |
| 2001:DB8:0:0:192:168:1:235 |
| Network Node Management IPv6 Address |
| (after omitting consecutive sections of zeros) |
| 2001:DB8::192:168:1:235 |

In the above example, the DHCPv6 service device 3 directly substitutes the decimal numbers of all four dot-decimal notation number groups in the assigned IPv4 address of the target network node N for the hexadecimal numbers of the colon-hexadecimal notation number groups in the last four suffix positions of the network node management IPv6 address without performing the decimal-to-hexadecimal base conversion. However, the present invention is not limited to this. For example, an IPv4 address can usually be divided into two parts: a network identifier (network ID) and a host identifier (host ID). In one local area network, the host identifier varies with the network node, but the network identifier does not. In other words, the network node can be identified based only on the host identifier. Therefore, as shown in Table 2 below, in another embodiment, the DHCPv6 service device 3 can directly substitute the decimal numbers (e.g. "1" and "235") of the dot-decimal notation number groups belonging to the host identifier of the assigned IPv4 address of the target network node for hexadecimal numbers of the colon-hexadecimal notation number groups in corresponding suffix positions (i.e., the last two suffix positions) of the network node management IPv6 address without performing the decimal-to-hexadecimal base conversion, thereby generating the network node management IPv6 address (i.e., "2001:DB8::FF00:1:235") with the visually recognizable suffix address code

TABLE 2

| Assigned IPv4 Address of Target Network Node |
|---|
| 192.168.1.235 |
| Predetermined IPv6 Address to be Assigned |
| 2001:0DB8:0000:0000:0000: FF00:????:???? |
| Network Node Management IPv6 Address |
| 2001:0DB8:0000:0000:0000:FF00:0001:0235 |
| Network Node Management IPv6 Address |
| (after removing all leading zeros) |
| 2001:DB8:0:0:0:FF00:1:235 |
| Network Node Management IPv6 Address |
| (after omitting consecutive sections of zeros) |
| 2001:DB8::FF00:1:235 |

Moreover, as shown in FIG. 5, in the case that the target network node N has not been configured with the IPv4 address, the DHCPv6 service device 3 generates the network node management IPv6 address according to predetermined address assignment rules (Sub-step S35). There are no restrictions on the predetermined address assignment rules, and preferably, in order to improve recognition for the network node management IPv6 address of the target network node N not having the assigned IPv4 address, in the embodiment, the DHCPv6 service device 3 uses a simulation-configured IPv4 address as the assigned IPv4 address of the target network node N, thereby generating the network node management IPv6 address, wherein the simulation-configured IPv4 address is selected from an out-of-range IPv4 address and a non-regular IPv4 address, the out-of-range IPv4 address is an address that is out of an IPv4 address assignment range of the network environment E, and the non-regular IPv4 address includes at least one hexadecimal digit from "A" to "F" or has at least one decimal number in dot-decimal notation number group having a value greater than 8 bits.

In the present invention, since the network environment E is a network environment in which IPv6 and IPv4 addresses coexist, in addition to the IPv6 addresses, the IPv4 addresses are also assigned to the network nodes N in the network environment E, wherein those IPv4 addresses to be assigned are determined within the IPv4 address assignment range, which is preconfigured to the network environment E, and therefore IPv4 addresses out of the IPv4 address assignment range are referred to as "the out-of-range IPv4 addresses". The simulation-configured IPv4 address can be selected from the out-of-range IPv4 addresses to avoid falling within the IPv4 address assignment range of the network environment E and to effectively prevent from occupying the network node management IPv6 address to be assigned to the network node N having been configured with the IPv4 address. In addition, since in a regular IPv4 address, each number in the dot-decimal notation number groups is a decimal number and has a value not greater than 8 bits (i.e., 0~255), IPv4 addresses including at least one hexadecimal digit from "A" to "F" or having at least one decimal number having a value greater than 8 bits are referred to as "the non-regular IPv4 address". The simulation-configured IPv4 address can also be selected from the non-regular IPv4 address to avoid falling within the IPv4 address assignment range of the network environment E and to effectively prevent from occupying the network node management IPv6 address to be assigned to the network node N having been configured with the IPv4 address.

Specifically, as shown in Table 3 below, in the embodiment, when the target network node N has not been configured with the IPv4 address, from the out-of-range IPv4 addresses (e.g., "192.168.2.1~192.168.2.255" and "10.0.0.1~10.0.0.255" when the IPv4 address assignment range is "192.168.1.1~192.168.1.255") or the non-regular IPv4 address (e.g., "192.168.1.A~192.168.1.F", "192.168.A.1~192.168.A.255" and "192.168.1.256~192.168.1.FFFF"), the DHCPv6 service device 3 can select the simulation-configured IPv4 address (e.g., "192.168.1.A") as the assigned IPv4 address of the target network node N. In this way, the generated network node management IPv6 address (i.e., "2001:DB8::192:168:1:A") also has the visually recognizable suffix address code of "192:168:1:A", and thereby the network administrator not only can easily remember and recognize the target network node N, but also can identify that the target network node N is not configured with an IPv4 address.

TABLE 3

Figure 6:
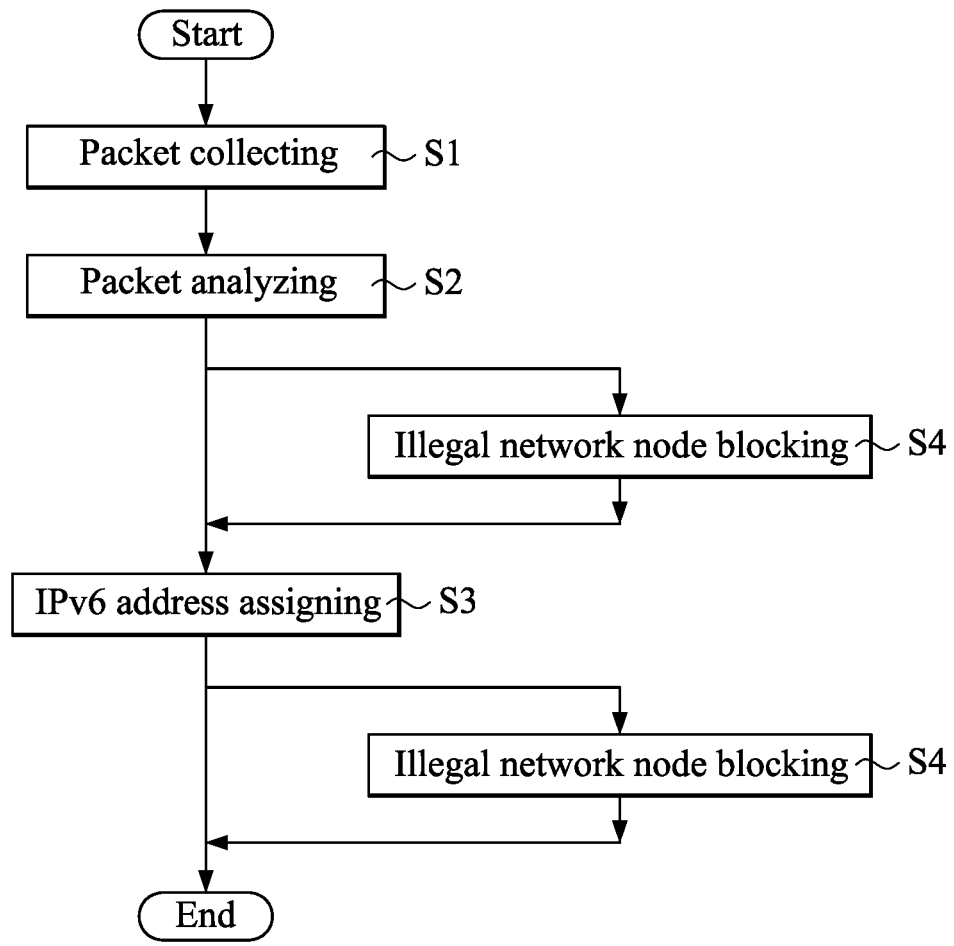
FIG. 6 is a schematic flowchart illustrating an IPv6 network node managing method according to another embodiment of the present invention.

Assigned IPv4 Address of Target Network Node
   Null
Simulation-Configured IPv4 Address
   192.168.1.A
Network Node Management IPv6 Address
   2001:0DB8:0000:0000:0192:0168:0001:000A
Network Node Management IPv6 Address
(after removing all leading zeros)
   2001:DB8:0:0:192:168:1:A
Network Node Management IPv6 Address
(after omitting consecutive sections of zeros)
   2001:DB8::192:168:1:A As shown in FIG. 6 and FIG. 3, in another embodiment of the present invention, the IPv6 network node managing method further comprises an illegal network node blocking step S4 of: comparing the network node information obtained in the packet analyzing step S2 with a predetermined network node allowable list 41 to determine whether the network node N having an assigned IPv6 address is a legal network node or is an illegal network node in the network environment E; and blocking the network node N which is determined as the illegal network node. Since the illegal network node blocking step S4 and the IPv6 address assigning step S3 do not affect each other, the illegal network node blocking step S4 can be performed before, after or simultaneously with the IPv6 address assigning step S3, and the present invention is not limited to this.

Figure 7:
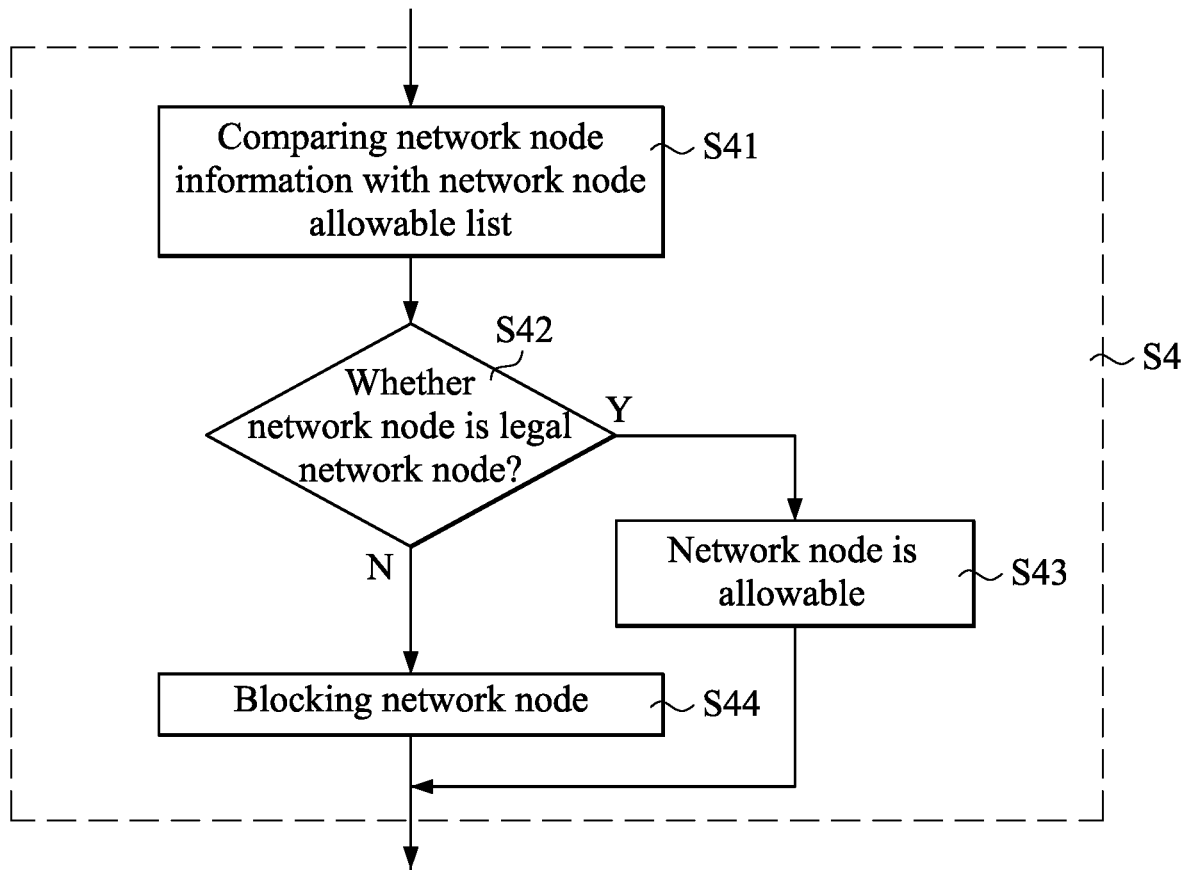
FIG. 7 is a schematic flowchart illustrating an illegal network node blocking step of the IPv6 network node managing method according to the embodiment of the present invention.

As shown in FIG. 7 and FIG. 3, in the embodiment, the IPv6 network node managing equipment 100 further comprises a network node management device 4 for performing the illegal network node blocking step S4. Specifically, the network node management device 4 is configured to: compare the network node information obtained by the packet analyzing device 2 with the network node allowable list 41 (Sub-step S41), thereby determining whether the network node N is the legal network node in the network node allowable list 41 or not (Sub-step S42). When the network node N is the legal network node, the network node N is allowed to be in the network environment E (Sub-step S43). When the network node N is the illegal network node, the network node N will be blocked (Sub-step S44), for example, by sending a fake gateway-related ICMPv6 neighbor advertisement packet to the illegal network node. However, the present invention is not limited to this, and any conventional way of blocking network nodes can be used in the illegal network node blocking step S4.

Figure 8:
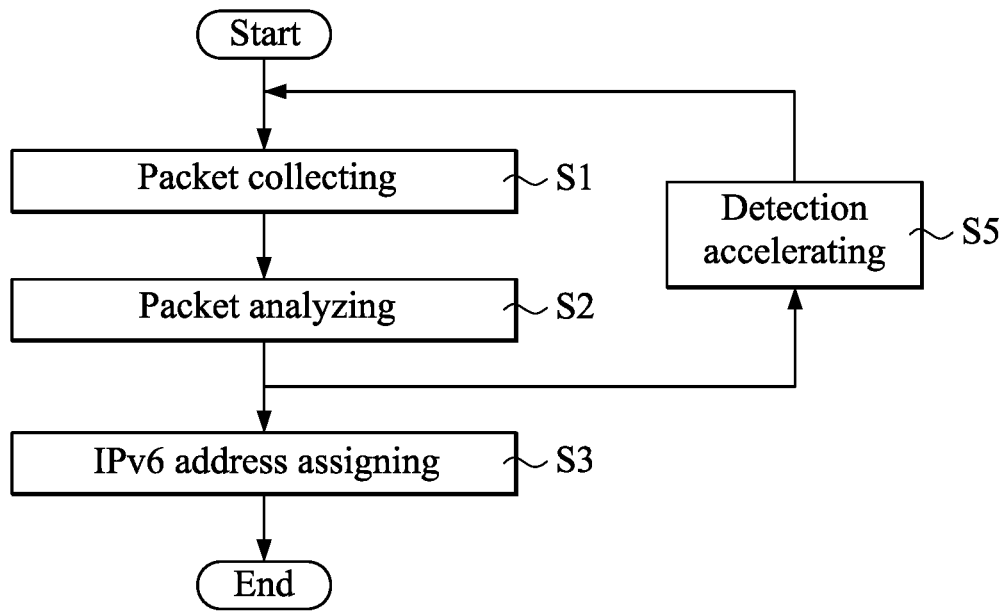
FIG. 8 is a schematic flowchart illustrating an IPv6 network node managing method according to another embodiment of the present invention.
Figure 9:
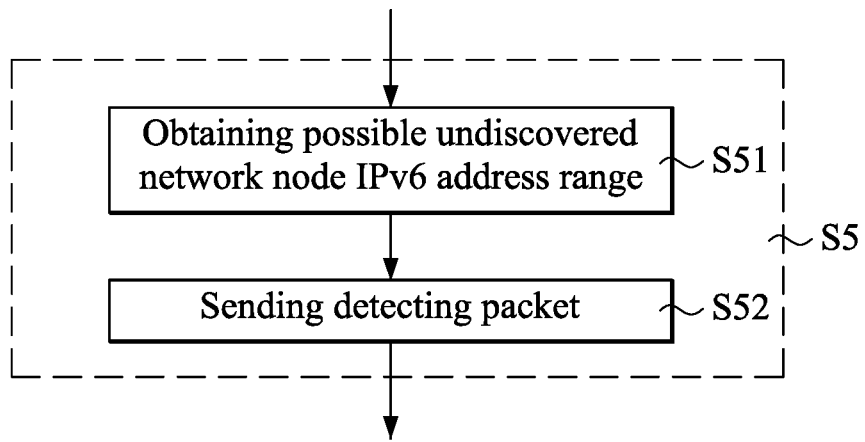
FIG. 9 is a schematic flowchart illustrating a detection accelerating step of the IPv6 network node managing method according to the embodiment of the present invention.

As shown in FIG. 8, FIG. 9 and FIG. 3, in another embodiment of the present invention, the IPv6 network node managing method further comprises a detection accelerating step S5 of: obtaining a possible undiscovered network node IPv6 address range by performing a computing operation according to the IP address information of the network nodes N presently existing in the IP and MAC address correspondence table 21 and an IPv6 address assignment range of the network environment E (Sub-step S51); and sending a detecting packet to a target IPv6 address which is within the possible undiscovered network node IPv6 address range to enforce the corresponding network node N in the network environment E to sent the network node packet containing the network node information (Sub-step S52). Specifically, since the network node N in the network environment E may use a static IPv6 address or the network node packet (e.g., the neighbor solicitation packet and the neighbor advertisement packet) containing the IPv6 address information of the network node N may have not been collected, the network node information of network node N may be undiscovered, i.e., not exist in the IP and MAC address correspondence table 21. Through the detection accelerating step S5, the undiscovered network node N can be driven to send the network node packet containing the network node information as soon as possible, so as to accelerate the update of the IP and MAC address correspondence table 21, thereby enabling the IPv6 network node managing equipment 100 to quickly grasp and manage all network nodes N in the network environment E.

The IPv6 address assignment range, which is provided by an Internet Service Provider (ISP), is a set of the IPv6 addresses to be assigned to the network nodes N in the network environment E. According to the IPv6 address assignment range and the IPv4 address information presently existing in the IP and MAC address correspondence table 21, possible IPv6 addresses for each network node N in the network environment E are estimated via the computing operation, and a set of these possible IPv6 addresses can be obtained. By comparing the set of the possible IPv6 addresses with the IPv6 address information presently existing in the IP and MAC address correspondence table 21, undiscovered IPv6 addresses which not presently exist in the IP and MAC address correspondence table 21 can be found in the set of the possible IPv6 addresses, and a set of these undiscovered IPv6 addresses is referred to as the possible undiscovered network node IPv6 address range. Next, the detecting packet (e.g., a detecting packet for duplicate address detection (DAD)) is sent to the IPv6 addresses within the possible undiscovered network node IPv6 address range and thereby, when being detected, the corresponding network nodes N are enforced to sent the network node packets (e.g., the neighbor advertisement packet) containing the network node information. In this way, the IPv6 network node managing equipment 100 can collect the network node packets so as to quickly update the network node information of the network node in the IP and MAC address correspondence table 21. In comparison with the manner of detecting the whole IPv6 address assignment range of the network environment E, the manner of the accelerated detection step S5 reduces the amount required to be detected to a reduced range (i.e., the possible undiscovered network node IPv6 address range), which makes the detection faster and more efficient.

The above description should be considered as only the discussion of the preferred embodiments of the present invention. However, a person having ordinary skill in the art may make various modifications without deviating from the present invention. Those modifications still fall within the scope of the present invention.

What is claimed is:

1. An IPv6 network node managing method, which is applied to a network environment where IPv6 and IPv4 addresses are coexisted, for managing network nodes of the network environment, the IPv6 network node managing method comprising:
   a packet collecting step, which utilizes a packet collecting device to collect network node packets of each network node in the network environment;
   a packet analyzing step, which utilizes a packet analyzing device to analyze the network node packets collected in the packet collecting step to obtain, from the network node packets, network node information belonging to the network nodes, and creates an IP and MAC address correspondence table according to the network node information, wherein the network node information contains IP address information and MAC address information; and
   an IPv6 address assigning step, which utilizes a DHCPv6 service device to assign a network node management IPv6 address, which is generated according to the IP and MAC address correspondence table, to a target network node which requests an IPv6 address assignment, wherein the DHCPv6 service device directly substitutes decimal numbers of dot-decimal notation number groups, which have been given to an assigned IPv4 address of the target network node, for hexadecimal numbers of colon-hexadecimal notation number groups in suffix positions of the network node management IPv6 address without performing a decimal-to-hexadecimal base conversion, thereby generating the network node management IPv6 address with a visually recognizable suffix address code.

2. The IPv6 network node managing method as claimed in claim 1, wherein in the packet analyzing step, the IP address information of the network node information includes IPv6 address information of the network node, and
   the packet analyzing device obtains, from the network node packets regarding a neighbor solicitation packet and/or a neighbor advertisement packet which are defined by a neighbor discovery protocol, the network node information containing the IPv6 address information and/or the MAC address information.

3. The IPv6 network node managing method as claimed in claim 2, wherein in the packet analyzing step, the operation of obtaining, from the network node packets, the network node information containing the IPv6 address information and/or the MAC address information includes:
   an IPv6 packet classifying sub-step, which classifies the network node packet having an EtherType field content of "0x86DD" into an IPv6-classified packet;
   an ICMPv6 packet classifying sub-step, which classifies the IPv6-classified packet having a Next Header field content of "58" into an ICMPv6-classified packet; and
   an information acquiring sub-step, which acquires, from the ICMPv6-classified packet having a Type field content of "135" or "136", the network node information containing the IPv6 address information and/or the MAC address information.

4. The IPv6 network node managing method as claimed in claim 1, wherein in the IPv6 address assigning step, the DHCPv6 service device directly substitutes the decimal numbers of all four dot-decimal notation number groups in the assigned IPv4 address of the target network node for the hexadecimal numbers of the colon-hexadecimal notation number groups in the last four suffix positions of the network node management IPv6 address without performing the decimal-to-hexadecimal base conversion.

5. The IPv6 network node managing method as claimed in claim 1, wherein in the IPv6 address assigning step, when the target network node does not have the assigned IPv4 address, the DHCPv6 service device uses a simulation-configured IPv4 address as the assigned IPv4 address of the target network node, thereby generating the network node management IPv6 address,
   wherein the simulation-configured IPv4 address is selected from an out-of-range IPv4 address and a non-regular IPv4 address, the out-of-range IPv4 address is an address that is out of an IPv4 address assignment range of the network environment, and the non-regular IPv4 address includes at least one hexadecimal digit from "A" to "F" or has at least one decimal number in dot-decimal notation number group having a value greater than 8 bits.

6. The IPv6 network node managing method as claimed in claim 1, further comprising an illegal network node blocking step of:
   comparing the network node information obtained in the packet analyzing step with a predetermined network node allowable list to determine whether the network node having an assigned IPv6 address is a legal network node or is an illegal network node in the network environment; and
   blocking the network node which is determined as the illegal network node.

7. The IPv6 network node managing method as claimed in claim 1, further comprising a detection accelerating step of:
   obtaining a possible undiscovered network node IPv6 address range by performing a computing operation according to the IP address information of the network nodes presently existing in the IP and MAC address correspondence table and an IPv6 address assignment range of the network environment; and
   sending a detecting packet to a target IPv6 address which is within the possible undiscovered network node IPv6 address range to enforce the corresponding network node in the network environment to send the network node packet containing the network node information of network node within the possible undiscovered network node IPv6 address range.

* * * * *